(12) United States Patent
Yamamoto et al.

(10) Patent No.: US 11,674,236 B2
(45) Date of Patent: Jun. 13, 2023

(54) PLATING APPARATUS AND PLATING SYSTEM

(71) Applicant: YAMAMOTO-MS Co., Ltd., Tokyo (JP)

(72) Inventors: Wataru Yamamoto, Tokyo (JP); Kimiko Koiwa, Tokyo (JP); Katsunori Akiyama, Tokyo (JP); Yoshiaki Hoshino, Saitama (JP)

(73) Assignee: YAMAMOTO-MS Co., Ltd., Tokyo (JP)

( * ) Notice: Subject to any disclaimer, the term of this patent is extended or adjusted under 35 U.S.C. 154(b) by 431 days.

(21) Appl. No.: 16/980,834

(22) PCT Filed: Mar. 13, 2018

(86) PCT No.: PCT/JP2018/009815
§ 371 (c)(1),
(2) Date: Sep. 14, 2020

(87) PCT Pub. No.: WO2019/175990
PCT Pub. Date: Sep. 19, 2019

(65) Prior Publication Data
US 2021/0254236 A1    Aug. 19, 2021

(51) Int. Cl.
*C25D 21/12* (2006.01)
*C25D 17/02* (2006.01)
*C25D 17/10* (2006.01)

(52) U.S. Cl.
CPC ............ *C25D 21/12* (2013.01); *C25D 17/02* (2013.01); *C25D 17/10* (2013.01)

(58) Field of Classification Search
CPC ..................................................... C25D 17/10
See application file for complete search history.

(56) References Cited

U.S. PATENT DOCUMENTS 3,554,878 A * 1/1971 Rothschild ............... C25D 7/04
205/252
8,691,597 B2 4/2014 Kanaoka

FOREIGN PATENT DOCUMENTS

JP    H03183136 A    8/1991
JP    2001168524 A   6/2001
(Continued)

OTHER PUBLICATIONS

International Search Report and Written Opinion for International Application No. PCT/JP2018/009815, dated May 29, 2018; date of filing: Mar. 13, 2018; 7 pp.

*Primary Examiner* — Hosung Chung
(74) *Attorney, Agent, or Firm* — Grumbles Law PLLC

(57) ABSTRACT

There is provided a plating apparatus capable of suitably measuring a micro-throwing power. A first plating apparatus (1A) includes: a first anode (12A) disposed in a first plating bathtub (11A); an insulating substrate (4) having a hole (5) and disposed in the first plating bathtub (11A); a pair of first cathodes (13AX, 13AY), each cathode being provided in the insulating substrate (4) at a bottom portion of the hole (5) and at a surface on an opening side of the hole (5); a first plating power source (14A) configured to supply an electric current between the first anode (12) and the pair of first cathodes (13AX, 13AY); and a first electric current measuring circuit (22A) configured to measure respective values of electric currents flowing through the pair of first cathodes (13AX, 13AY).

6 Claims, 8 Drawing Sheets

(56) References Cited

FOREIGN PATENT DOCUMENTS

JP        2009242876 A    10/2009
TW         201315845 A1    4/2013

* cited by examiner

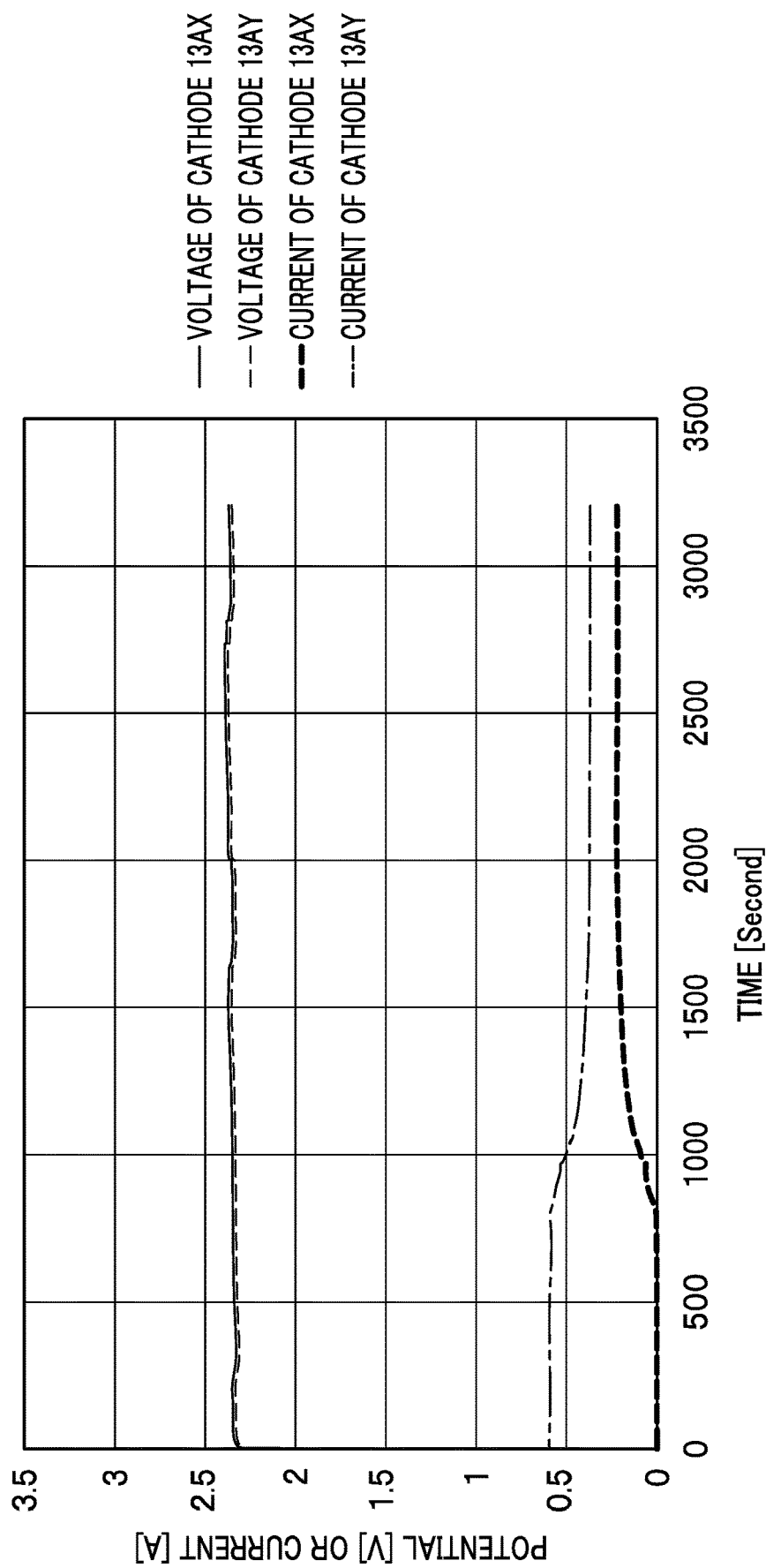

PLATING APPARATUS AND PLATING SYSTEM

FIELD OF THE DISCLOSURE

The present invention relates to a plating apparatus and a plating system which are used for, for example, Haring cell test and the like.

BACKGROUND OF THE INVENTION

Conventionally, Haring cell test has been known as a method for evaluating a plating performance. According to Haring cell test, plating is performed with an anode disposed between a pair of cathodes, and a throwing power (uniform electroplating ability) of plating by which a material that is plated on the pair of cathodes is evaluated.

According to electroplating, current density and an amount of a plated material (metal) basically have a proportional relationship. However, if a condition in which there is not much difference in an amount of the plated material relative to a wide range of current density is achieved, a film having a uniform thickness can be formed by plating on a product having a complex shape. Ability to provide a uniform plating film thickness regardless of a current density is referred to as a throwing power.

The throwing power is largely dependent on a current distribution. A current distribution is roughly classified into a first current distribution and a second current distribution. The first current distribution is dependent on geometrical conditions (shape of an object to be plated, shape of a plating bathtub, arrangement of electrodes and the like) in the plating bathtub regardless of plating bath, plating conditions and the like. The first current distribution can be determined by a mathematical calculation or the like. The majority of a plating distribution is dependent on the first current distribution.

However, when plating is actually performed, a polarization phenomenon occurs on a cathode interface, and a new current distribution, i.e. a second current distribution is generated. The second current distribution is dependent on electrochemical characteristics such as polarization on a cathode, a conductivity of the plating bath and the like, and is changed by a type of a plating bath, a type and an amount of an additive, or the like.

SUMMARY OF THE INVENTION

To measure a throwing power, the conventional Haring cell test is carried out by measuring a macro-throwing power that is an ability to deposit a film uniformly on the entire surface of an object to be plated. However, the conventional Haring cell test could not be carried out by measuring a micro-throwing power that is an ability to deposit a film in a recess (groove, hole, etc.) of an object to be plated.

The present invention has been made in view of the above problem, and it is an object of the present invention to provide a plating apparatus and a plating system which are capable of suitably measuring a micro-throwing power.

To address the above problem, the present invention provides a plating apparatus comprising: an anode disposed in a plating bathtub; an insulating substrate having a hole, the insulating substrate being disposed in the plating bathtub; a pair of cathodes, each cathode being provided in the insulating substrate at a bottom portion of the hole and at a surface on an opening side of the hole; a plating power source configured to supply an electric current between the anode and the pair of cathodes; and at least one of an electric current measuring portion configured to measure respective values of electric currents flowing through the pair of cathodes and a voltage measuring portion configured to measure voltage values of the pair of cathodes.

According to the present invention, it is possible to suitably measure a micro-throwing power.

BRIEF DESCRIPTION OF THE DRAWINGS

FIG. 8 is a graph showing a change over time in electric current value and voltage value of the cathodes when a correction to a potential using a feedback circuit was carried out in the first plating apparatus.

DETAILED DESCRIPTION

Figure 1A:
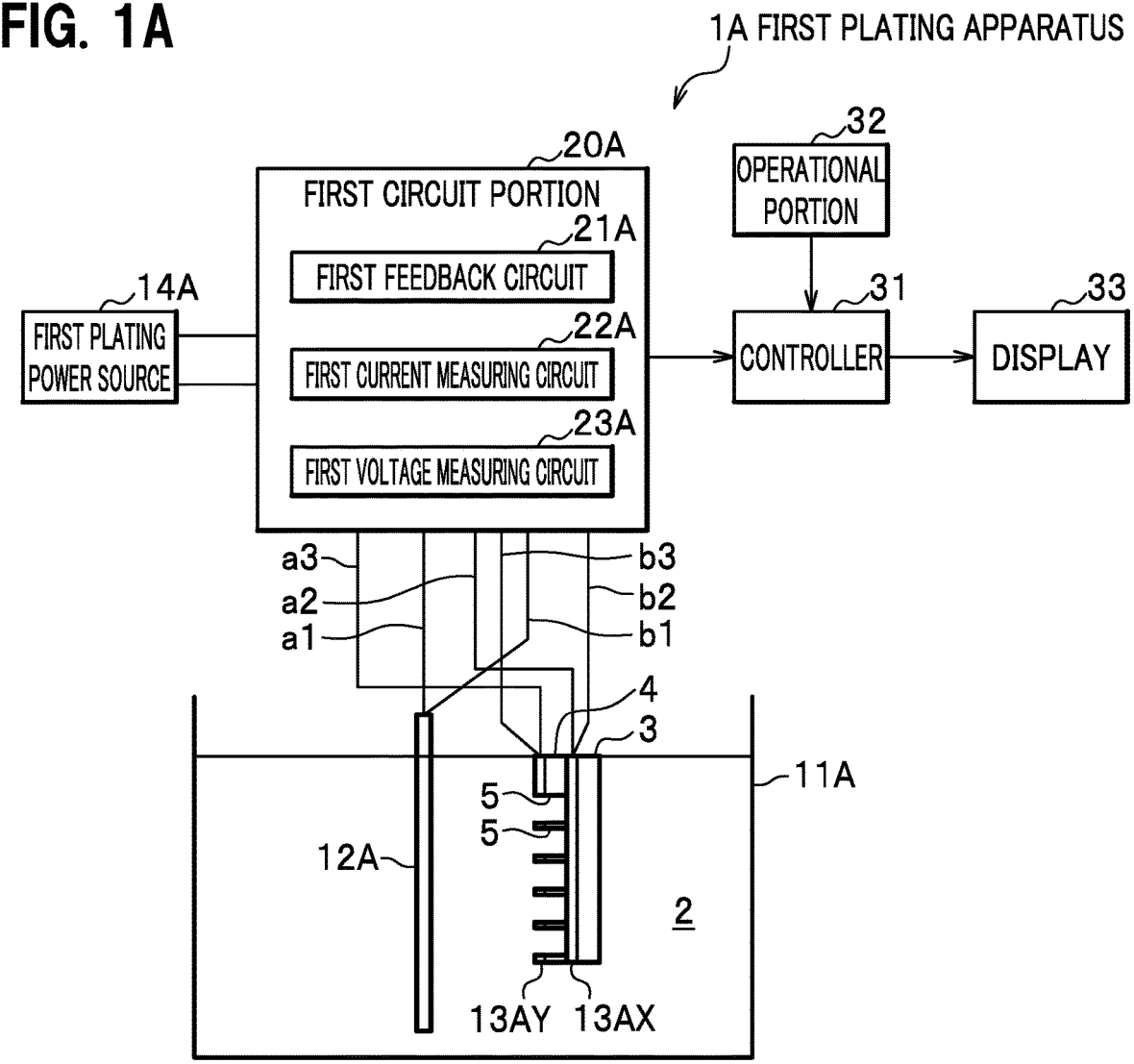
FIG. 1A is a schematic view showing a first plating apparatus according to a first embodiment of the present invention.

An embodiment of the present invention will be described in detail with reference to the drawings, in which a plating apparatus and a plating system according to the present invention has been applied to a plating tester used for Haring cell test. In the explanation, the same constituent elements are denoted by the same reference numerals and a duplicated explanation is omitted.

First Embodiment

As shown in FIG. 1A, a first plating apparatus 1A according to a first embodiment of the present invention is a plating tester to carry out Haring cell test according to which plating is simultaneously performed on a pair of cathodes 13AX, 13AY, and a throwing power, more specifically, a micro-throwing power is evaluated.

According to the first plating apparatus 1A, plating is performed, for example, by electrolysis under a constant electric current or electrolysis under a constant voltage (according to this embodiment, electrolysis under a constant electric current according to which a summation of electric currents flowing through the pair of first cathodes 13AX, 13AY is constant, and under a constant voltage). The first plating apparatus 1A includes a first plating bathtub 11A, a first anode 12A, a pair of first cathodes 13A (13AX, 13AY), a first plating power source (rectifier) 14A, a first circuit portion 20A, a controller 31, an operational portion 32, and a display 33.

<First Plating Bathtub>

A first plating bath 2 is put in the first plating bathtub 11A. The first plating bath 2 may be a copper sulfate plating bath (general bath, High throwing bath).

<First Anode>

A first anode 12A is a metal plate which is disposed beside the pair of first cathodes 13AX, 13AY in the first plating bathtub 11A and is submerged in the plating bath 2.

<First Cathodes>

The pair of first cathodes 13AX, 13AY are apart from each other. The first cathodes 13AX, 13AY are metal plates disposed opposite to the first anode 12A in the first plating bathtub 11A and submerged in the plating bath 2. In this embodiment, the first plating apparatus 1A includes a substrate 3 made of an insulating material, one first cathode (one of the pair of first cathodes) 13AX provided on one surface of the substrate 3, a substrate 4 made of an insulating material and sandwiching the first cathode 13AX together with the substrate 3, and another first cathode (the other one of the pair of first cathodes) 13AY provided on one surface of the substrate 4. A plurality of holes 5 in the shape of a circular cylinder are formed in the substrate 4 and the another first cathode 13AY. The one first cathode 13AX constitutes a bottom surface of a hole 5. Further, a structural member consisting of the substrate 3, the substrate 4, and the pair of first cathodes 13AX, 13AY is disposed in the plating bath 2 with openings of the holes 5 being directed toward the first anode 12A.

<First Plating Power Source (Rectifier)>

The first plating power source (rectifier) 14A supplies an electric current for plating to the pair of first cathodes 13AX, 13AY. The first plating power source 14A is electrically connected to the first anode 12A and the pair of first cathodes 13AX, 13AY through a first circuit portion 20A. The first plating power source 14A is a DC power source for supplying an electric current to deposit plating on the pair of first cathodes 13AX, 13AY. According to this embodiment, the first plating power source 14A is a constant-current power source. A summation of an electric current flowing through the first cathode 13AX and an electrical current flowing through the first cathode 13AY is set constant.

<First Circuit Portion>

The first circuit portion 20A constitutes an electric circuit, together with the first anode 12A, the pair of first cathodes 13AX, 13AY, and the first plating power source 14A. The first circuit portion 20A includes a first feedback circuit 21A, a first current measuring circuit 22A, and a first voltage measuring circuit 23A.

<First Feedback Circuit>

The first feedback circuit 21A carries out a feedback control based on voltages (potentials) of the respective first cathodes 13AX, 13AY and the first anode 12A so as to have an electrode potential of one of the pair of first cathodes 13AX, 13AY equal to an electrode potential of the other one of the pair of first cathodes 13AX, 13AY. In other words, the first feedback circuit 21 carries out a feedback control based on voltages (potentials) of the respective first cathodes 13AX, 13AY and the first anode 12A so as to have a potential difference between the first anode 12A and the first cathode 13AX equal to a potential difference between the first anode 12A and the first cathode 13AY. This feedback control is carried out in a state of a constant electric current according to which a summation of an electric current flowing through the first cathode 13AX and an electric current flowing through the first cathode 13AY is kept constant. This state of a constant electric current may be achieved by an ability of the first plating power source 14A, or may be achieved by a circuit configuration of the first circuit portion 20A. The first feedback circuit 21A can be omitted.

<First Current Measuring Circuit>

The first current measuring circuit 22A measures respective values of electric currents flowing through the pair of first cathodes 13AX, 13AY, and outputs measured electric current values to the controller 31. These electric current values approach each other when the holes 5 are filled with a plating film and the first cathodes 13AX, 13AY are electrically connected to each other. Namely, the electric current values and the change over time (time from when plating is initiated to when these electric current values approach each other) are parameters indicating a micro-throwing power of the plating bath 2.

<First Voltage Measuring Circuit>

The first voltage measuring circuit 23A measures respective electrode potentials of the pair of first cathodes 13AX, 13AY, that is, voltage values, and outputs measured voltage values to the controller 31. If it is not necessary to measure voltage values, the first voltage measuring circuit 23A can be omitted. These voltage values approach each other under the condition that a feedback control using the first feedback circuit 21A is not carried out and when the holes 5 are filled with a plating film and the first cathodes 13AX, 13AY are electrically connected to each other. Namely, the voltage values and the change over time (time from when plating is initiated to when these electric current values approach each other) are parameters indicating a micro-throwing power of the plating bath 2.

<Controller>

The controller 31 includes a CPU (Central Processing Unit), a ROM (Read-Only Memory), a RAM (Random Access Memory), an input/output circuit and the like. The controller 31 obtains values of electric currents flowing through the pair of cathodes 13X, 13Y measured by the first current measuring circuit 22A, and outputs them to the display 33. Further, the controller 31 obtains voltage values applied to the pair of first cathodes 13AX, 13AY measured by the first voltage measuring circuit 23A, and outputs them to the display 33.

Further, the controller 31 can calculate an amount (theoretical amount) of the plated material deposited on the pair of second cathodes 13AX, 13AY based on the values of electric currents (total electric current value) flowing through the pair of second cathodes 13AX, 13AY, and can output them to the display 33. The theoretical amount A (g) of the plated material is calculated by the following equation with use of an electric current I (A) flowing through the pair of cathodes 13A, an energizing time t (s), Faraday constant F (C/mol), an atomic weight M (g/mol) of a deposited metal plated by plating, and the valence number z of an ion.

$$A = I \cdot t \cdot M / (z \cdot F)$$

Herein, Faraday constant F is stored in advance in the controller 31. An electric current I is measured by the second current measuring circuit 22A. An energizing time t is measured by the controller 31. The atomic weight M and the valence number Z of an ion are input into the controller 31 by user's operation of the operational portion 32, or are selected from vales stored in advance in the controller 31 by user's operation of the operational portion 32.

<Operational Portion>

The operational portion 32 includes a keyboard, a mouse, and the like. The operational portion 32 outputs to the controller 31 an operational result produced by an operation of a user.

<Display>

The display 33 is a monitor. The display 33 displays as a graph a change over time in electric current value, voltage value and the like outputted from the controller 31.

<One Example of Circuit Diagram>

Figure 2:
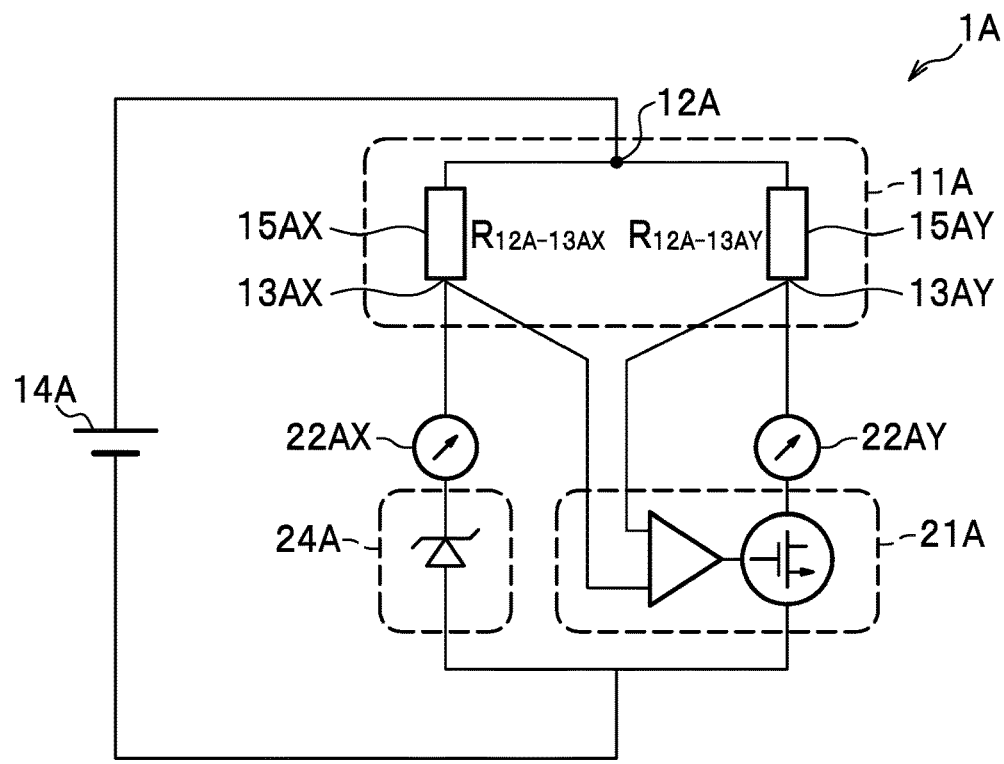
FIG. 2 is an example of a circuit diagram of the first plating apparatus according to the first embodiment of the present invention.

FIG. 2 is a circuit diagram in which a resistance 15AX of the first anode 12A and the first cathode 13AX and a resistance 15AY of the first anode 12A and the first cathode 13AY are schematically described to show a structure of the first anode 12A and the pair of first cathodes 13AX, 13AY disposed in the first plating bathtub 11A. As shown in FIG. 2, the first plating apparatus 1A according to the first embodiment of the present invention performs plating under a constant-current electrolysis according to which a summation of electric currents flowing through the pair of first cathodes 13AX, 13AY is kept constant (constant electric current). The plating apparatus 1A includes, as an electric circuit, the first plating power source 14A, the pair of resistances 15AX, 15AY, the pair of ammeters 22AX, 22AY, the first feedback circuit 21A, and a constant-voltage circuit 24A. According to this circuit, the resistance 15AX, the ammeter 22AX and the constant-voltage circuit 24A are connected in series, and the resistance 15AY, the ammeter 22AY and the first feedback circuit 21A are connected in series. Further, a combination of the resistance 15AX, the ammeter 22AX and the constant-voltage circuit 24A and a combination of the resistance 15AY, the ammeter 22AY and the first feedback circuit 21A are disposed in parallel to each other with respect to the first plating power source 14A.

<First Plating Power Source>

According to this embodiment, a positive electrode of the first plating power source 14A is electrically connected to the first anode 12A, and a negative electrode of the first plating power source 14A is electrically connected to the pair of first cathodes 13AX, 13AY.

<Resistances>

The resistance 15AX is a cell resistance to indicate a potential difference between the first anode 12A and the first cathode 13AX. The resistance 15AY is a cell resistance to indicate a potential difference between the first anode 12A and the first cathode 13AY.

<Ammeters>

The ammeter 22AX, which is one of the first current measuring circuit 22A, measures a value of an electric current flowing through the resistance 15AX, that is, the first cathode 13AX. The ammeter 22AY, which is one of the first current measuring circuit 22A, measures a value of an electric current flowing through the resistance 15AY, that is, the first cathode 13AY.

<First Feedback Circuit>

The first feedback circuit 21A performs control so as to have an electrode potential of the first cathode 13AY equal to that of the first cathode 13AX as a reference (an electrode potential difference between the first cathode 13AX and the first cathode 13AY becomes zero). The first feedback circuit 21A is not limited to an FET (Field Effect Transistor) shown in the figures, and can be realized with a bipolar transistor, a semiconductor element, or the like.

<Constant-Voltage Circuit>

The constant-voltage circuit 24A, which is one of the first circuit portion 20A, is a circuit for raising an electrode potential of the first cathode 13AX in order to put an electrode potential of the first cathode 13AY in a voltage range in which the first feedback circuit 21A can control. Instead of the constant-voltage circuit 24A, the first plating apparatus 1A may include a diode or a resistance having an operational effect similar to the constant-voltage circuit 24A.

When configuring this electric circuit, signal input lines b1, b2, b3 (see FIG. 1) for measuring an electric current value and a voltage value and clips (not shown) for connecting the signal input lines b1, b2, b3 to the electrodes 12A, 13AX, 13AY, respectively are provided separately from signal input lines a1, a2, a3 (see FIG. 1) for energizing the respective electrodes 12A, 13AX, 13AY and clips (not shown) for connecting the signal input lines a1, a2, a3 to the electrodes 12A, 13AX, 13AY, respectively. In other words, they are not shared and separate from each other.

<Another Example of Circuit Diagram>

Figure 3:
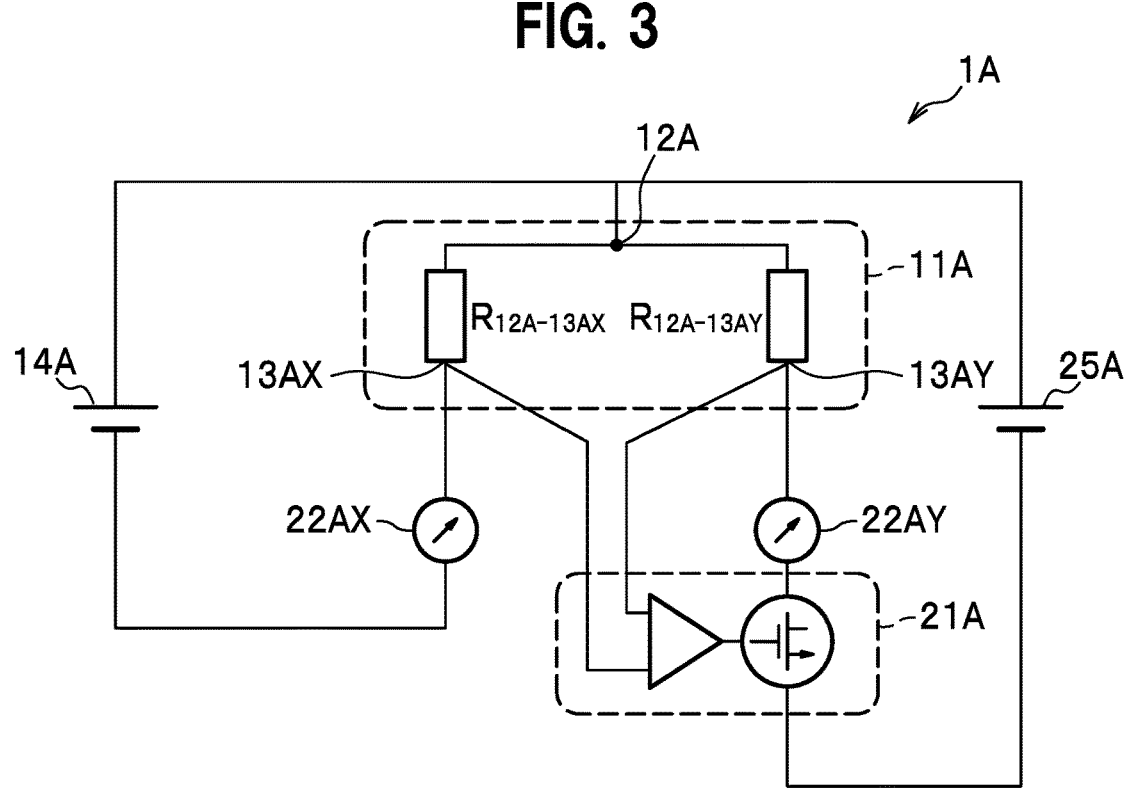
FIG. 3 is an example of a circuit diagram of the first plating apparatus according to the first embodiment of the present invention.

Another example of the circuit diagram of the first plating apparatus 1A according to the first embodiment of the present invention will be explained mainly about differences from the one example of the circuit diagram as described above. As shown in FIG. 3, the first plating apparatus 1A according to the first embodiment of the present invention performs plating under a constant-current electrolysis according to which a summation of electric currents flowing through the pair of first cathodes 13AX, 13AY is kept constant (constant electric current). The first plating apparatus 1A shown in FIG. 3 includes, as a component of an electric circuit, an auxiliary power source 25A, in place of the constant-voltage circuit 24.

<Auxiliary Power Source and First Plating Power Source>

The auxiliary power source (rectifier) 25A, which is one of the first circuit portion 20A, is a direct current power source for supplying a plating current to the first cathode 13AY. According to this embodiment, the auxiliary power source 25A is a constant-current power source, and a combination of the first plating power source 14A and the auxiliary power source 25A makes a summation of an electric current flowing through the first cathode 13AX and an electric current flowing through the first cathode 13AY constant. A positive electrode of the auxiliary power source 25A is electrically connected to the first anode 12A, and a negative electrode is electrically connected to the first cathode 13AY.

According to this embodiment, the first plating power source 14A supplies a plating current to the first cathode 13AX. A positive electrode of the first plating power source 14A is electrically connected to the first anode 12A, and a negative electrode is electrically connected to the first cathode 13AX.

According to this electric circuit, a plating current from the first plating power source 14A flows through the first cathode 13AX, a plating current from the auxiliary power source 25A flows through the first cathode 13AY, and a total plating current of the first cathodes 13AX, 13AY flows through the first anode 12A.

An electrode potential of the negative electrode of the auxiliary power source 25A is set to be lower than that of the negative electrode of the first plating power source 14A by a predetermined range (for example, several hundred volt (mV) to several volt (V)). This is a preliminary step in order to put an electrode potential of the first cathode 13AY in a voltage range in which the first feedback circuit 21A can control an electrode potential of the first cathode 13AY. Further, the auxiliary power source 25A has an ability to sufficiently provide a plating current flowing through the first cathode 13AY.

When configuring this electric circuit, signal input lines b1, b2, b3 (see FIG. 1) for measuring an electric current value and a voltage value and clips (not shown) for connecting the signal input lines b1, b2, b3 to the electrodes 12A, 13AX, 13AY, respectively are provided separately from signal input lines a1, a2, a3 (see FIG. 1) for energizing the respective electrodes 12A, 13AX, 13AY and clips (not shown) for connecting the signal input lines a1, a2, a3 to the electrodes 12A, 13AX, 13AY, respectively. In other words, they are not shared and separate from each other.

When the first plating apparatus 1A performs plating, a plating film deposited on the first cathode 13AY is grown in the holes 5 and is electrically connected to the first cathode 13AY. If a feedback control using the first feedback circuit 21A is being carried out, the electric current values of the first cathodes 13AX, 13AY approach each other at this point of time. If a feedback control using the first feedback circuit 21A is not being carried out, the electric current values and the voltage values of the first cathodes 13AX, 13AY almost match with each other at this point of time. The controller 31 can measure time from starting of plating to this point of time as a parameter indicating a micro-throwing power.

Further, as to the combination of the first cathodes 13AX, 13AY and the substrates 3, 4, the first plating apparatus 1A can predict differences (embedding property) in microthrowing power with respect to objects to be plated having various recesses (grooves, holes, etc.) by preparing and measuring various objects each having a different shape (diameter, depth, distance, etc.) of the holes 5.

The first plating apparatus 1A according to the first embodiment of the present invention includes the first cathodes 13AX, 13AY provided at the bottom surfaces of the holes 5 and at peripheral edges of the openings of the holes 5, so that it is possible to suitably measure a micro-throwing power.

Further, the first plating apparatus 1A can carry out Haring cell test while eliminating influences of the ammeters 22AX, 22AY.

Second Embodiment

Figure 4:
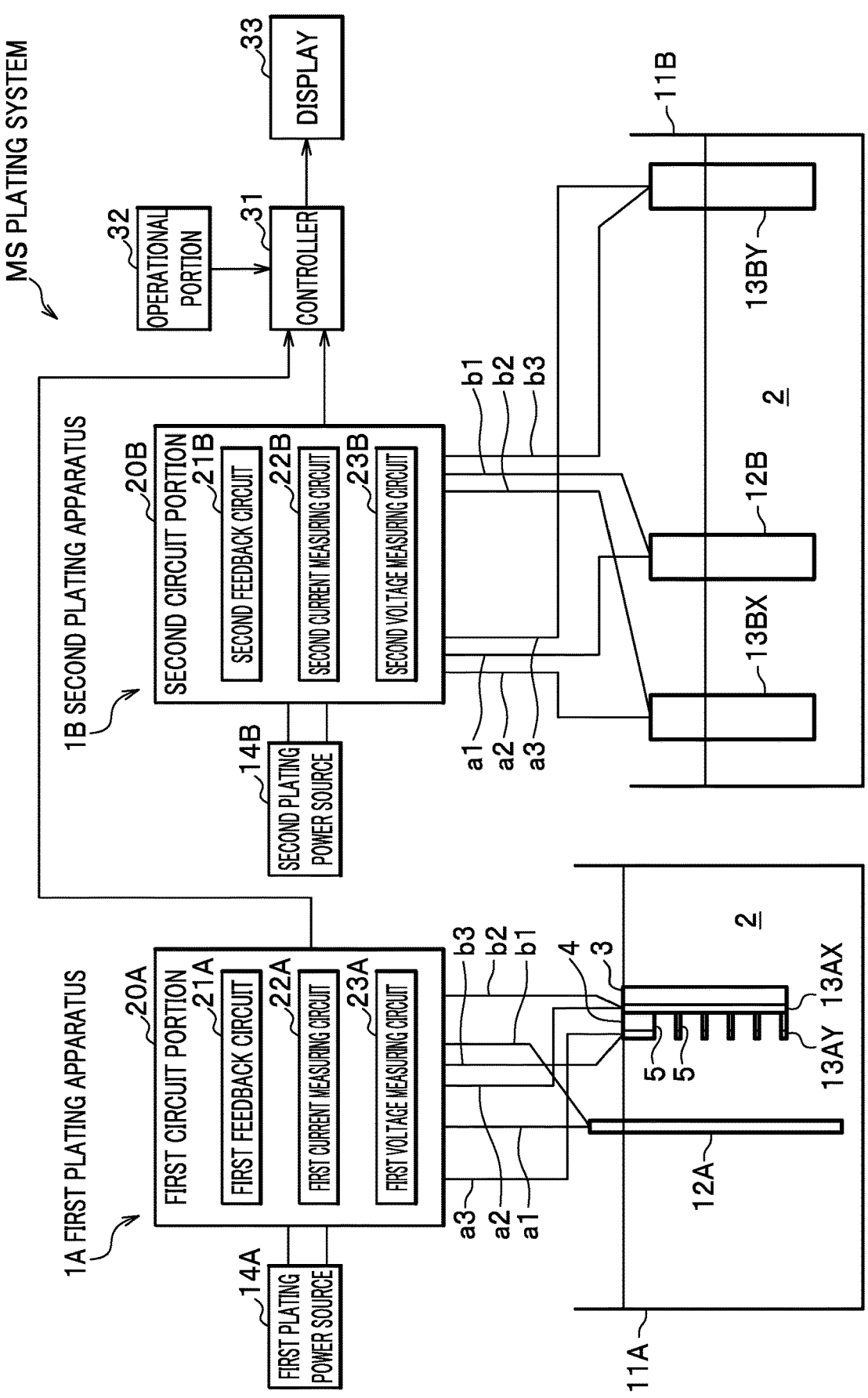
FIG. 4 is a schematic view showing a plating system according to a second embodiment of the present invention.

Next, a plating system according to a second embodiment of the present invention will be explained mainly about differences from the first plating apparatus 1A according to the first embodiment. As shown in FIG. 4, a plating system MS according to the second embodiment of the present invention includes, as a second plating apparatus 1B according to a second embodiment, a second plating bathtub 11B, a second anode 12B, a pair of second cathodes 13B (13BX, 13BY), a second plating power source (rectifier) 14B, and a second circuit portion 20B. The controller 31, the operational portion 32, and the display 33 are commonly used in the first plating apparatus 1A and in the second plating apparatus 1B.

The plating apparatus 1B according to the second embodiment of the present invention is a plating tester to carry out Haring cell test according to which plating is simultaneously performed on the pair of second cathodes 13BX, 13BY, and a throwing power, more specifically, a macro-throwing power is evaluated based on the weight of a deposited plated material. According to the second plating apparatus 1B, plating is performed, for example, by electrolysis under a constant electric current or electrolysis under a constant voltage (according to this embodiment, electrolysis under a constant electric current according to which a summation of electric currents flowing through the pair of second cathodes 13BX, 13BY is constant, and under a constant voltage).

<Second Plating Bathtub>

Plating bath 2, the same as that put in the first plating bathtub 11A, is put in the second plating bathtub 11B. The plating bath 2 may be a copper sulfate plating bath (general bath, High throwing bath).

<Second Anode>

The second anode 12B is a metal plate which is disposed between the pair of second cathodes 13BX, 13BY in the second plating bathtub 11B and is submerged in the plating bath 2. The second anode 12B can change a distance between each second cathode 13BX, 13BY. Namely, between the pair of second cathodes 13BX, 13BY, the second anode 12B can approach one second cathode 13BX (i.e., move away from the other second cathode 13BY), or approach the other second cathode 13BY (i.e., move away from the one second cathode 13BX).

<Second Cathode>

The pair of second cathodes 13BX, 13BY are apart from each other. The second cathodes 13BX, 13BY are metal plates disposed with the second anode 12B being interposed therebetween in the second plating bathtub 11B and submerged in the plating bath 2. At least one of the second cathodes 13BX, 13BY may be a metal object on which plating is actually performed to provide a plated product.

It should be noted that the positional relationship between the second anode 12B and the pair of second cathodes 13BX, 13BY is not limited to the specific positional relationship as described above. For example, the pair of second cathodes 13BX, 13BY may be disposed on one side of the second anode 12B at different distances from the second anode 12B.

<Second Plating Power Source (Rectifier)>

The second plating power source (rectifier) 14B supplies an electric current for plating to the pair of second cathodes 13BX, 13BY. The second plating power source 14B is electrically connected to the second anode 12B and the pair of second cathodes 13BX, 13BY through a second circuit portion 20B. The second plating power source 14B is a DC power source for supplying an electric current to deposit plating on the pair of second cathodes 13BX, 13BY. According to this embodiment, the second plating power source 14B is a constant-current power source. A summation of an electric current flowing through the second cathode 13BX and an electrical current flowing through the second cathode 13BY is set constant.

<Second Circuit Portion>

The second circuit portion 20B constitutes an electric circuit, together with the second anode 12B, the pair of second cathodes 13BX, 13BY, and the second plating power source 14B. The second circuit portion 20B includes a second feedback circuit 21B, a second current measuring circuit 22B, and a second voltage measuring circuit 23B.

<Second Feedback Circuit>

The second feedback circuit 21B carries out a feedback control based on voltages (potentials) of the respective second cathodes 13BX, 13BY and the second anode 12B so as to have an electrode potential of one of the pair of second cathodes 13BX, 13BY equal to an electrode potential of the other one of the pair of second cathodes 13BX, 13BY. In other words, the second feedback circuit 21B carries out a feedback control based on voltages (potentials) of the respective second cathodes 13BX, 13BY and the second anode 12B so as to have a potential difference between the second anode 12B and the second cathode 13BX equal to a potential difference between the second anode 12B and the second cathode 13BY. This feedback control is carried out in a state of a constant electric current according to which a summation of an electric current flowing through the second cathode 13BX and an electric current flowing through the second cathode 13BY is kept constant. This state of a constant electric current may be achieved by an ability of the second plating power source 14B, or may be achieved by a circuit configuration of the second circuit portion 20B.

<Second Current Measuring Circuit>

The second current measuring circuit 22B measures respective electric current values flowing through the pair of second cathodes 13BX, 13BY, and outputs measured electric current values to the controller 31.

<Second Voltage Measuring Circuit>

The second voltage measuring circuit 23B measures respective electrode potentials of the pair of second cathodes 13BX, 13BY, that is, voltage values, and outputs measured voltage values to the controller 31. If it is not necessary to measure voltage values, the second voltage measuring circuit 23B can be omitted.

<Controller>

The controller 31 includes a CPU (Central Processing Unit), a ROM (Read-Only Memory), a RAM (Random Access Memory), an input/output circuit and the like. The controller 31 stores in advance distances (or a ratio between the distances) between the second anode 12B and the pair of second cathodes 13BX, 13BY outputted by the operational portion 32 before an actual test is carried out. Alternatively, the controller 31 obtains distances (or a ratio between the distances) between the second anode 12B and the pair of second cathodes 13BX, 13BY outputted by the operational portion 32 before calculating various parameters, and calculates various parameters based on the obtained distances (or the ratio between the distances). Further, the controller 31 obtains values of electric currents flowing through the pair of second cathodes 13BX, 13BY measured by the second current measuring circuit 22B, and outputs them to the display 33. Further, the controller 31 obtains voltage values applied to the pair of second cathodes 13BX, 13BY measured by the second voltage measuring circuit 23B, and outputs them to the display 33.

Further, the controller 31 can calculate a current distribution ratio, which is a ratio of an electric current flowing through the second cathode to an electric current flowing through the second cathode, based on the values of electric currents—flowing through the pair of second cathodes 13BX, 13BY measured by the second current measuring circuit 22B (more specifically, ammeters 22BX, 22BY to be described later), and can output them to the display 33.

Further, the controller 31 can calculate an amount (theoretical amount) of the plated material deposited on the pair of second cathodes 13BX, 13BY based on the values of electric currents (total electric current value) flowing through the pair of second cathodes 13BX, 13BY, and can output them to the display 33. The theoretical amount A (g) of the plated material is calculated by the following equation with use of an electric current I (A) flowing through the pair of cathodes 13B, an energizing time t (s), Faraday constant F (C/mol), an atomic weight M (g/mol) of a deposited metal plated by plating, and the valence number Z of an ion.

$$A = I \cdot t \cdot M / (z \cdot F)$$

Herein, Faraday constant F is stored in advance in the controller 31. An electric current I is measured by the second current measuring circuit 22B. An energizing time t is measured by the controller 31. The atomic weight M and the valence number Z of an ion are input into the controller 31 by user's operation of the operational portion 32, or are selected from vales stored in advance in the controller 31 by user's operation of the operational portion 32.

A relationship between a value of an electric current flowing through the second cathodes 13B and an actual amount of the deposited plated material on the second cathodes 13B is stored in the controller 31. That is, based on past experiments, a value of an electric current flowing through the second cathodes 13B and an amount of the deposited plated material which is actually deposited on the cathodes 13B at the electric current value per unit time are associated with the respective second cathodes 13BX, 13BY, and stored as a map and the like. A user measures a weight of each second cathode 13BX, 13BY before plating, and a weight (weight including the plated material) of each second cathode 13BX, 13BY after plating with use of a weight measuring instrument. Then the user obtains an amount (measured amount) of the plated material on each second cathode 13BX, 13BY by referring to a difference between them. Thereafter, the user stores the relationship in the controller 31 through user's operation of the operational portion 32, which relationship is based on the measured amount of the plated material and the electric current values (values measured by the ammeters 22BX, 22BY) at the pair of second cathodes 13BX, 13BY. The controller 31 can calculate an amount (estimated amount) of the plated material by referring to the relationship with use of results (values of electric currents flowing through the pair of second cathodes 13BX, 13BY) measured by the ammeters 22BX, 22BY and by taking the energizing time t into consideration, and can output it to the display 33.

Furthermore, the controller 31 can calculate a uniform electroplating index $T_A$ based on pre-stored distances between the second anode 12B and the pair of second cathodes 13BX, 13BY and the estimated amount of the plated material deposited on the pair of second cathodes 13BX, 13BY which is calculated, and can output it to the display 33. The uniform electroplating index $T_A$(%) can be calculated by the following equation:

$$T_A = \{(d_2/d_1) - (A_1/A_2)\} / \{(d_2/d_1) + (A_1/A_2) - 2\} \times 100$$

where the distance between the second cathode 13B closer to the second anode 12B and the second anode 12B is $d_1$, the distance between the second cathode 13B further from the second anode 12B and the second anode 12B is $d_2$, the estimated amount of the material plated on the second cathode 13B closer to the second anode 12B is $A_1$, and the estimated amount of the plated material on the second cathode 13B further from the second anode 12B is $A_2$.

Herein, the estimated amounts $A_1$, $A_2$ of the plated material are calculated with use of the relationship between the above-described electric current values and the actual amounts of the plated material (measured amounts of the plated material in a preliminary experiment). The distances $d_1$ and $d_2$ between the second anode and the pair of second cathodes are stored in the controller 31 through user's operation of the operational portion 32 while viewing a scale (scale indicating a distance ratio, or measure merely indicating a distance; not shown in the drawings) provided on the second plating bathtub 11B, or selected from values previously stored in the controller 31 through user's operation of the operational portion 32.

The uniform electroplating index $T_A$(%) is a parameter indicating a degree of uniformity of the plated material deposited on the pair of second cathodes 13BX, 13BY. The uniform electroplating index $T_A$ is a value which can be changed within the range of about ±100%. If a current distribution ratio of an electric current flowing through one of the second cathodes 13BX, 13BY to an electric current flowing through the other one of the second cathodes 13BX, 13BY is equal to an anode-cathode distance ratio $d_2/d_1$, the uniform electroplating index $T_A$ is 0(%). On the other hand, if amounts of the plated material deposited on the pair of second cathodes 13BX, 13BY are equal to each other, the uniform electroplating index $T_A$ is 100(%) regardless of a value of the anode-cathode distance ratio $d_2/d_1$. Namely, as the uniform electroplating index $T_A$ becomes closer to 100 (%), it indicates that electroplating is performed more uniformly on the pair of second cathodes 13BX, 13BY.

Further, the controller 31 can also calculate a uniform electroplating index $T_B$ with use of a value of an electric current actually flowing through each second cathode 13BX, 13BY, and can output it to the display 33. The uniform electroplating index $T_B$ (%) can be calculated by the following equation:

$$T_B = \{(d_2/d_1) - (I_1/I_2)\} / \{(d_2/d_1) + (I_1/I_2) - 2\} \times 100$$

where the value of an electric current flowing through the second cathode 13B closer to the second anode 12B is $I_1$, and the value of an electric current flowing through the second cathode 13B further from the second anode 12B is $I_2$.

Herein, the electric current values $I_1$, $I_2$ are measured by the second current measuring circuit 22B.

The uniform electroplating index $T_A$ using the distances $d_1$, $d_2$ between the second anode and the pair of second cathodes is a value relatively close to a theoretical value. On the other hand, the uniform electroplating index $T_B$ using the values of electric currents $I_1$, $I_2$ actually flowing (or current distribution ratio $I_1/I_2$) is susceptible to the performance of an actual plating bath 2 (for example, the performance of additives, electrical conductivity). A user can find the performance and the state of the plating bath 2 (for example, the performance and the balance of additives, and the effect to the electric current efficiency) by comparing the uniform electroplating indices $T_A$, $T_B$ and/or by observing a change in the value of the uniform electroplating index $T_B$ associated with changes in the electric current values $I_1$, $I_2$ (current distribution ratio $I_1:I_2$, $I_1/I_2$, or the like).

The controller 31 can also calculate the uniform electroplating indices $T_A$, $T_B$ with use of the theoretical amount of the plated material, and can output them to the display 33. In this case, the uniform electroplating indices $T_A$, $T_B$ based on the estimated amount of the plated material and the uniform electroplating indices $T_A$, $T_B$ based on the theoretical amount of the plated material can be compared by the user.

Further, the controller 31 can calculate the electric current efficiency based on the estimated amount of the plated material and the theoretical amount of the plated material, and can output it to the display 33. The electric current efficiency is a parameter to indicate how efficiently electric currents flowing through the second cathodes 13BX, 13BY are used to deposit a material.

Electric current efficiency (%)=(Estimated amount of the plated material/Theoretical amount of the plated material)×100

Regarding the electric current efficiency, an electric current efficiency at each second cathode 13BX, 13BY as well as a synthetic electric current efficiency based on the summation of the plated material on the second cathodes 13BX, 13BY can be also calculated.

A user of the plating system MS can actually measure an amount of the plated material (measured amount of the plated material) deposited on the second cathodes 13BX, 13BY with use of a weight measuring instrument, and can input the measured amount of the plated material into the controller 31 through an operation of the operational portion 32.

In this case, the controller 31 can obtain the measured amount of the plated material outputted from the operational portion 32, calculate an electric current efficiency based on the obtained measured amount of the plated material and a calculated theoretical amount of the plated material, and output it to the display 33.

Electric current efficiency (%)=(Measured amount of the plated material/Theoretical amount of the plated material)×100

This electric current efficiency may be calculated regarding the summation of the plated material deposited on the pair of second cathodes 13BX, 13BY, or may be calculated regarding an individual amount of the plated material of each second cathode 13BX, 13BY.

The controller 31 can calculate the uniform electroplating indices $T_A$, $T_B$ and the electric current efficiency for the current density of each second cathode 13BX, 13BY, and can output them to the display 33 in connection with the current density. Herein, the current density is calculated by the following equation using a value $I_X$ of an electric current flowing through the second cathode 13BX, a value $I_Y$ of an electric current flowing through the second cathode 13BY, an effective surface area (surface area, in the plating bath 2, on which a material can be plated) $S_X$ of the second cathode 13BX, and an effective surface area (surface area, in the plating bath 2, on which a material can be plated) $S_Y$ of the second cathode 13BY.

Mean current density (A/m²) at the pair of second cathodes 13BX,13BY=$(I_X+I_Y)/(S_X+S_Y)$ Current density (A/m²) of the second cathode 13BX=$I_X/S_X$ Current density (A/m²) of the second cathode 13BY=$I_Y/S_Y$ Herein, the effective surface areas $S_X$, $S_Y$ of the second cathodes 13BX, 13BY are stored in advance in the controller 31, or are input into the controller 31 through user's operation of the operational portion 32 before calculating the current densities. According to this embodiment, the second cathodes 13BX and the second cathode 13BY have the same shape, and the effective surface area $S_X$ and the effective surface area $S_Y$ are set to have the same value to each other. The present invention can be also applied to a case where the second cathode 13BX and the second cathode 13BY are different in shape, or to a case where the effective surface area $S_X$ and the effective surface area $S_Y$ are set to have different values.

<Operational Portion>

For example, the operational portion 32 outputs respective distances (or a distance ratio) between the second anode 12B and the pair of second cathodes 13BX, 13BY to the controller 31 by user's operation.

<One Example of Circuit Diagram>

Figure 5:
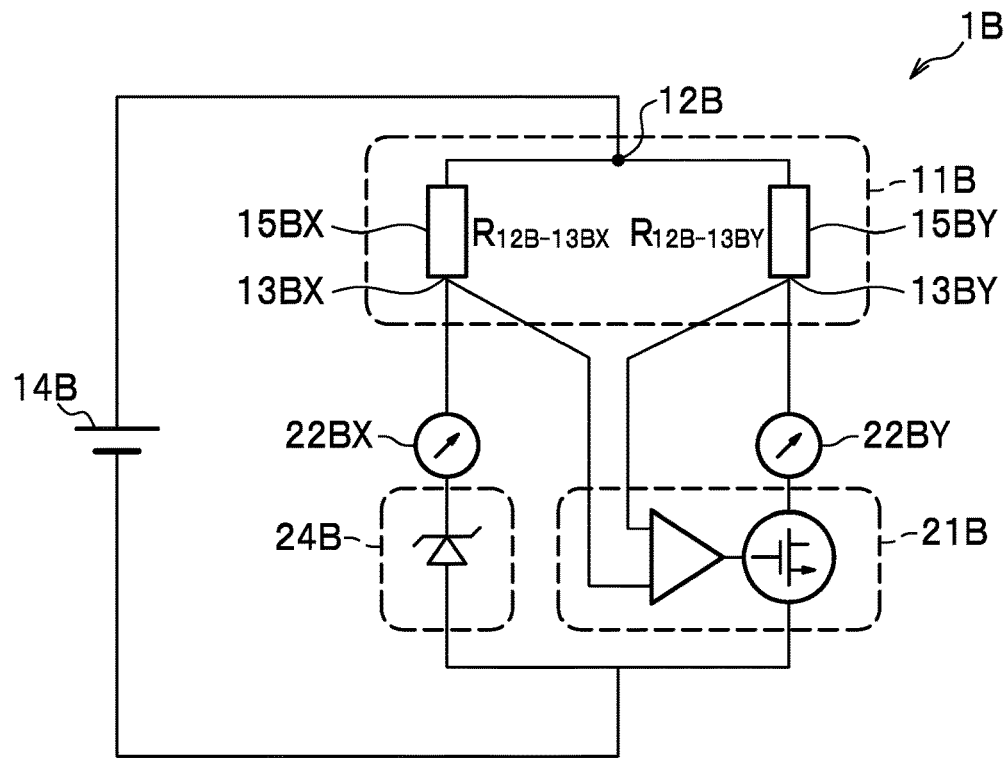
FIG. 5 is an example of a circuit diagram of a second plating apparatus according to a second embodiment of the present invention.

FIG. 5 is a circuit diagram in which a resistance 15BX of the second anode 12B and the second cathode 13BX and a resistance 15BY of the second anode 12B and the second cathode 13BY are schematically described to show a structure of the second anode 12B and the pair of second cathodes 13BX, 13BY disposed in the second plating bathtub 11B. As shown in FIG. 5, the second plating apparatus 1B according to the second embodiment of the present invention performs plating under a constant-current electrolysis according to which a summation of electric currents flowing through the pair of second cathodes 13BX, 13BY is kept constant (constant electric current). The plating apparatus 1B includes, as an electric circuit, the second plating power source 14B, the pair of resistances 15BX, 15BY, the pair of ammeters 22BX, 22BY, the second feedback circuit 21B, and a constant-voltage circuit 24B. According to this circuit, the resistance 15BX, the ammeter 22BX and the constant-voltage circuit 24B are connected in series, and the resistance 15BY, the ammeter 22BY and the second feedback circuit 21B are connected in series. Further, a combination of the resistance 15BX, the ammeter 22BX and the constant-voltage circuit 24B and a combination of the resistance 15BY, the ammeter 22BY and the second feedback circuit 21B are disposed in parallel to each other with respect to the second plating power source 14B.

<Second Plating Power Source>

According to this embodiment, a positive electrode of the second plating power source 14B is electrically connected to the second anode 12B, and a negative electrode of the second plating power source 14B is electrically connected to the pair of second cathodes 13BX, 13BY.

<Resistances>

The resistance 15BX is a cell resistance to indicate a potential difference between the second anode 12B and the second cathode 13BX. The resistance 15Y is a cell resistance to indicate a potential difference between the second anode 12B and the second cathode 13BY.

<Ammeters>

The ammeter 22BX, which is one of the second current measuring circuit 22B, measures a value of an electric current flowing through the resistance 15BX, that is, the second cathode 13BX. The ammeter 22BY, which is one of the second current measuring circuit 22B, measures a value of an electric current flowing through the resistance 15BY, that is, the second cathode 13BY.

<Second Feedback Circuit>

The second feedback circuit 21B performs control so as to have an electrode potential of the second cathode 13BY equal to that of the second cathode 13BX as a reference (an electrode potential difference between the second cathode 13BX and the second cathode 13BY becomes zero). The second feedback circuit 21B is not limited to an FET (Field Effect Transistor) shown in the figures, and can be realized with a bipolar transistor, a semiconductor element, or the like.

<Constant-Voltage Circuit>

The constant-voltage circuit 24B, which is one of the second circuit portion 20B, is a circuit for raising an electrode potential of the second cathode 13BX in order to put an electrode potential of the second cathode 13BY in a voltage range in which the second feedback circuit 21B can control. Instead of the constant-voltage circuit 24B, the second plating apparatus 1B may include a diode or a resistance having an operational effect similar to the constant-voltage circuit 24B.

When configuring this electric circuit, signal input lines b1, b2, b3 (see FIG. 4) for measuring an electric current value and a voltage value and clips (not shown) for connecting the signal input lines b1, b2, b3 to the electrodes 12B, 13BX, 13BY, respectively are provided separately from signal input lines a1, a2, a3 (see FIG. 4) for energizing the respective electrodes 12B, 13BX, 13BY and clips (not shown) for connecting the signal input lines a1, a2, a3 to the electrodes 12B, 13BX, 13BY, respectively. In other words, they are not shared and separate from each other.

<Another Example of Circuit Diagram>

Figure 6:
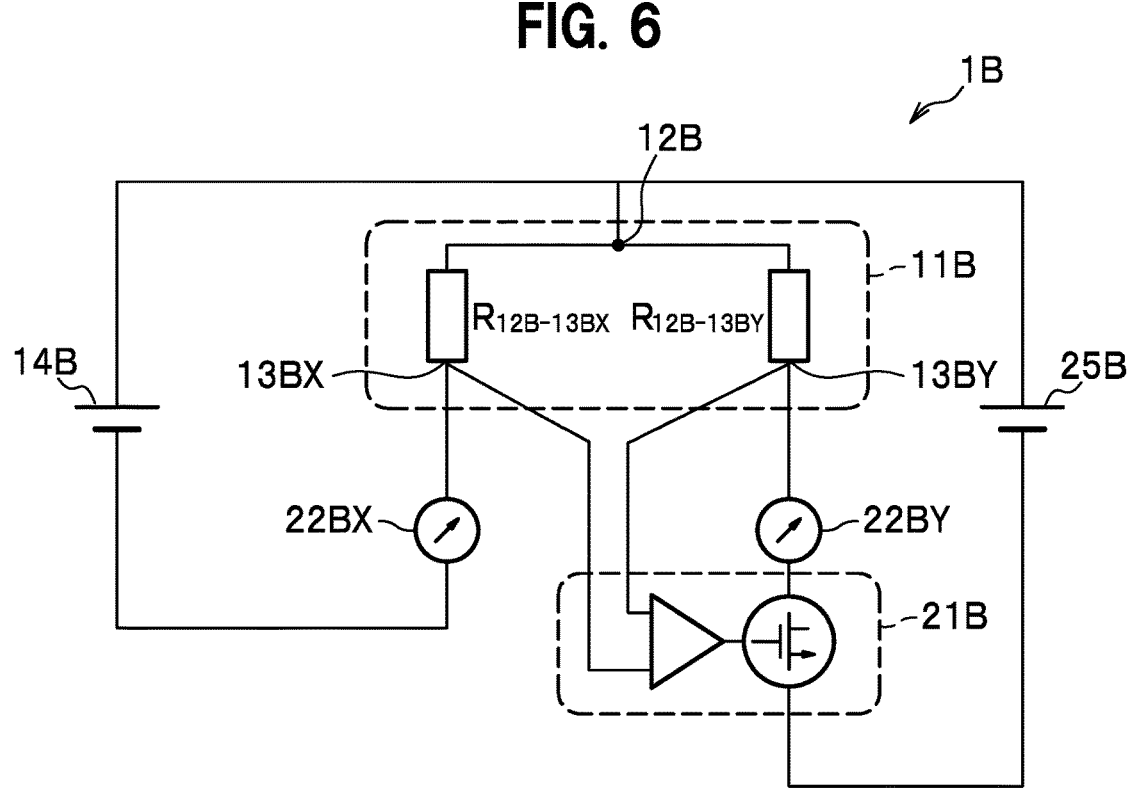
FIG. 6 is an example of a circuit diagram of the second plating apparatus according to a second embodiment of the present invention.

Another example of the circuit diagram of the second plating apparatus 1B according to the second embodiment of the present invention will be explained mainly about differences from the one example of the circuit diagram as described above. As shown in FIG. 6, the second plating apparatus 1B according to the second embodiment of the present invention performs plating under a constant-current electrolysis according to which a summation of electric currents flowing through the pair of second cathodes 13BX, 13BY is kept constant (constant electric current). The second plating apparatus 1B shown in FIG. 6 includes, as a component of an electric circuit, an auxiliary power source 25B, in place of the constant-voltage circuit 24B.

<Auxiliary Power Source and Second Plating Power Source>

The auxiliary power source (rectifier) 25B, which is one of the second circuit portion 20B, is a direct current power source for supplying a plating current to the second cathode 13BY. According to this embodiment, the auxiliary power source 25B is a constant-current power source, and a combination of the second plating power source 14B and the auxiliary power source 25B makes a summation of an electric current flowing through the second cathode 13BX and an electric current flowing through the second cathode 13BY constant. A positive electrode of the auxiliary power source 25 is electrically connected to the second anode 12B, and a negative electrode is electrically connected to the second cathode 13BY.

According to this embodiment, the second plating power source 14B supplies a plating current to the second cathode 13BX. A positive electrode of the second plating power source 14B is electrically connected to the second anode 12B, and a negative electrode is electrically connected to the second cathode 13BX.

According to this electric circuit, a plating current from the second plating power source 14B flows through the second cathode 13BX, a plating current from the auxiliary power source 25B flows through the second cathode 13BY, and a total plating current of the second cathodes 13BX, 13BY flows through the second anode 12B.

An electrode potential of the negative electrode of the auxiliary power source 25B is set to be lower than that of the negative electrode of the second plating power source 14B by a predetermined range (for example, several hundred volt (mV) to several volt (V)). This is a preliminary step in order to put an electrode potential of the second cathode 13BY in a voltage range in which the second feedback circuit 21B can control an electrode potential of the second cathode 13BY. Further, the auxiliary power source 25B has an ability to sufficiently provide a plating current flowing through the second cathode 13BY.

When configuring this electric circuit, signal input lines b1, b2, b3 (see FIG. 4) for measuring an electric current value and a voltage value and clips (not shown) for connecting the signal input lines b1, b2, b3 to the electrodes 12B, 13BX, 13BY, respectively are provided separately from signal input lines a1, a2, a3 (see FIG. 4) for energizing the respective electrodes 12B, 13BX, 13BY and clips (not shown) for connecting the signal input lines a1, a2, a3 to the electrodes 12B, 13BX, 13BY, respectively. In other words, they are not shared and separate from each other.

The plating system MS according to the second embodiment of the present invention can measure as a uniform electroplating index a macro-throwing power in addition to a micro-throwing power. Therefore, the plating system MS can suitably measure the ability of the plating bath 2.

Further, according to the plating system MS including the second plating apparatus 1B, the second feedback circuit 21B matches electrode potentials of the second cathodes 13BX, 13BY with each other while a summation of electric currents flowing through the second cathodes 13BX, 13BY is kept constant. Therefore, an influence of resistance elements, such as wiring resistance, contact resistance and the like to be included in the circuit, can be eliminated, and Haring cell test based on the original and unaffected secondary current distribution can be carried out.

Further, the plating system MS including the second plating apparatus 1B can measure, based on the original and unaffected secondary current distribution, the amount of the plated material and the uniform electroplating index $T_B$ (per current density, more specifically, per mean current density flowing through the pair of second cathodes 13BX, 13BY); the amount of the plated material and the uniform electroplating index $T_B$ are excellent in reproducibility and reliability.

Further, the plating system MS including the second plating apparatus 1B can carry out Haring cell test without adverse effects of the ammeters 22BX, 22BY.

Further, the plating system MS including the second plating apparatus 1B can accurately calculate the current distribution ratio ($I_1:I_2$, $I_1/I_2$, or the like) of electric currents flowing through the second cathodes 13BX, 13BY using measurement results measured by the ammeters 22BX, 22BY.

Further, based on the theoretical amount of the plated material and the estimated amount of the plated material on the second cathodes 13BX, 13BY which are calculated by the plating system MS, a user of the plating system MS including the second plating apparatus 1B can find the electric current efficiency at the second cathodes 13BX, 13BY (per current density, more specifically, per mean current density at the pair of second cathodes 13BX, 13BY, or per individual current density at each second cathode 13BX, 13BY), that is, the cathode electric current efficiency at the whole or each of the pair of second cathodes 13BX, 13BY.

Since the current distribution ratio, the electric current efficiency, and the uniform electroplating index $T_B$ greatly change depending on components of the plating bath 2, a user can find a change over time in characteristics and state of the plating bath 2 by observing changes over time in the current distribution ratio, the electric current efficiency, and the uniform electroplating index $T_B$.

Although the present invention has been described above with reference to the exemplified embodiments, it is to be understood that the present invention is not limited to the above embodiments and various modifications may be made without departing from the gist of the present invention. For example, the diameter, the depth, and the distance of the holes 5 of the first plating apparatus 1A may be changed where appropriate. Further, as a modified embodiment, the plating apparatus may include a circular cylindrical first cathode having a relatively large diameter and a circular cylindrical second cathode having a relatively small diameter, and a plating film may be deposited with the second cathode being accommodated in the first cathode. Further, the holes 5 of the first plating apparatus 1A may be through holes continuously extending through the first cathode 13A and the substrate 4.

EXAMPLES

Example 1

Figure 1B:
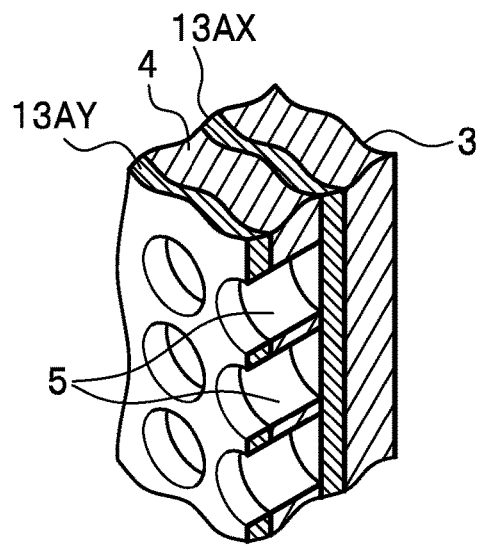
FIG. 1B is a sectional view schematically showing a first cathode.
Figure 7:
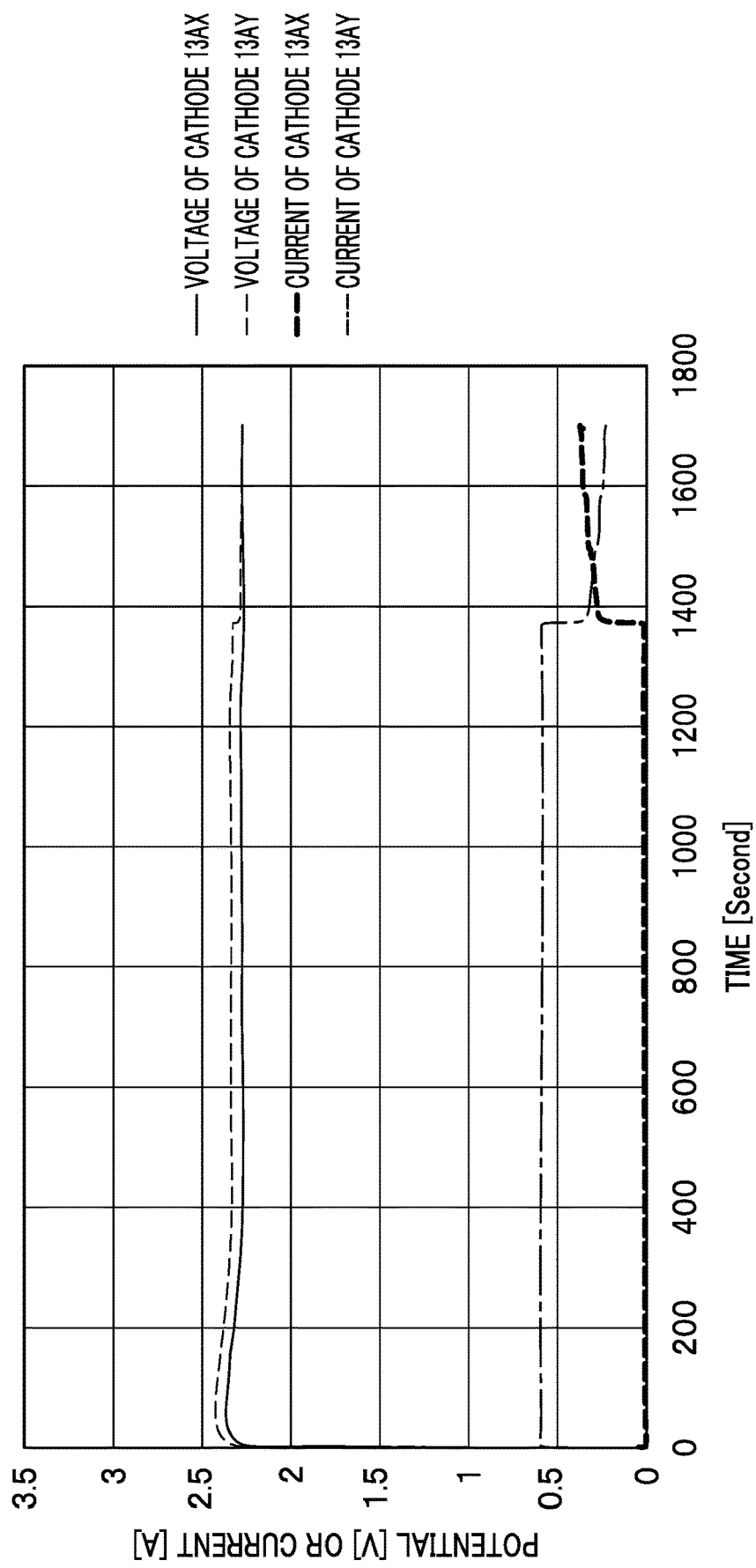
FIG. 7 is a graph showing a change over time in electric current value and voltage value of the cathodes when a correction to a potential using a feedback circuit was not carried out in the first plating apparatus.

A copper plating was performed without additives and without stirring air by using an apparatus in which the first feedback circuit 21A is omitted from the first plating apparatus 1A (see FIG. 1). As shown in FIG. 7, in a case where a correction to an electrode potential was not performed, voltage values and electric current values of the pair of first cathodes 13AX, 13AY almost coincide with each other in the vicinity of 1,400 (seconds) after the start of plating. This is because a copper plating layer grown on the first cathode 13AX fills in the holes 5 and is electrically connected to the first cathode 13AY.

Example 2

A copper plating was performed without additives and with stirring air by using the first plating apparatus 1A (see FIG. 2). As shown in FIG. 8, in a case where a correction to an electrode potential was performed by the first feedback circuit 21A, electric current values of the pair of first cathodes 13AX, 13AY approach each other in the vicinity of 1,000 (seconds) after the start of plating. This is because a copper plating layer grown on the first cathode 13AX fills in the holes 5 and is electrically connected to the first cathode 13AY.

Example 3

Figure 9A:
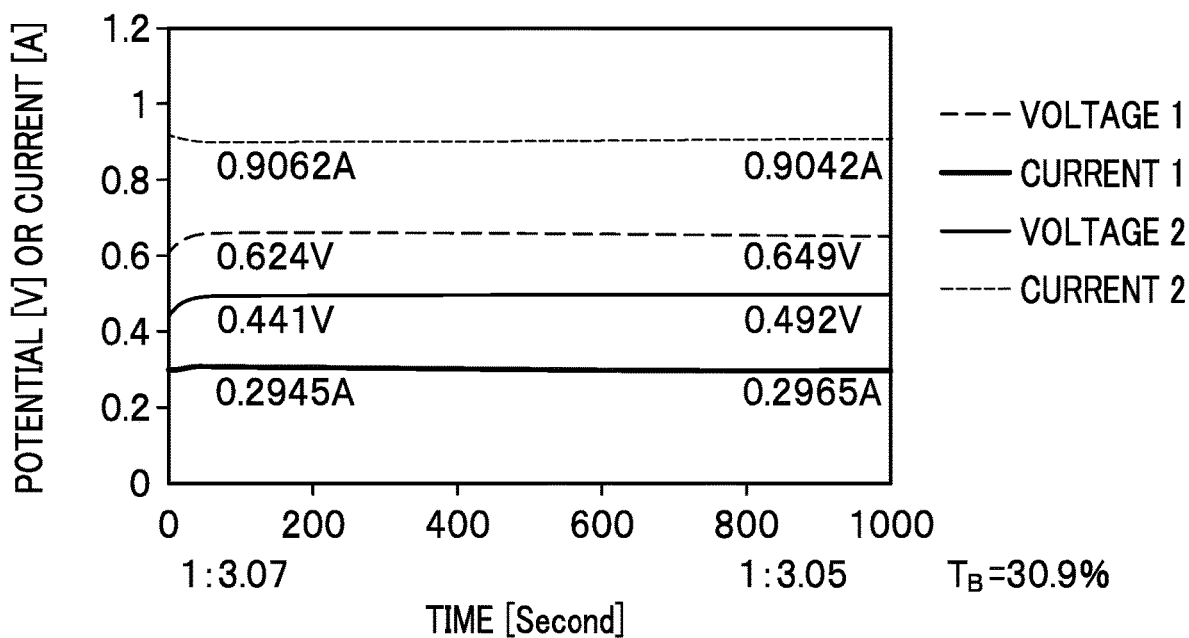
FIG. 9A is a graph showing a change over time in electric current value and voltage value of the cathodes when a correction to a potential using a feedback circuit was not carried out in the second plating apparatus.

A copper sulfate plating was performed in a general bath without additives by using the second plating apparatus 1B (see FIG. 4). The total electric current of the electric circuit was set to be 1.2 (A), and the anode-cathode distance ratio (distance between the second anode 12B and the second cathode 13BX:distance between the second anode 12B and the second cathode 13BY) was set to be 1:5. A change over time in electric current value and voltage value of the second cathodes 13BX, 13BY in a case (comparative example) where a correction to an electrode potential in the second plating apparatus 1B (see FIG. 4) was not carried out by the second feedback circuit 21B is shown in FIG. 9A. Meanwhile, a change over time in electric current value and voltage value of the second cathodes 13BX, 13BY in a case (example) where a correction to an electrode potential in the second plating apparatus 1B was carried out by the second feedback circuit 21B is shown in FIG. 9B.

As shown in FIG. 9A, in a case where a correction to an electrode potential was not carried out, a potential difference of about 160 (mV) was generated between electrode potentials of the pair of second cathodes 13BX, 13BY at the time of 1,000 (seconds) after the start of plating. Further, due to the effect caused by a wiring resistance and the like, the current distribution ratio (value of an electric current flowing through the second cathode 13BX:value of an electric current flowing through the second cathode 13BY) was 1:3.05, which is a relatively low ratio. This is because a wiring resistance and the like make values of electric currents flowing through the pair of second cathodes 13BX, 13BY equal to each other. Therefore, the uniform electroplating index $T_B$ using an estimated amount of a plated material became 30.9(%), which is a relatively large value.

Figure 9B:
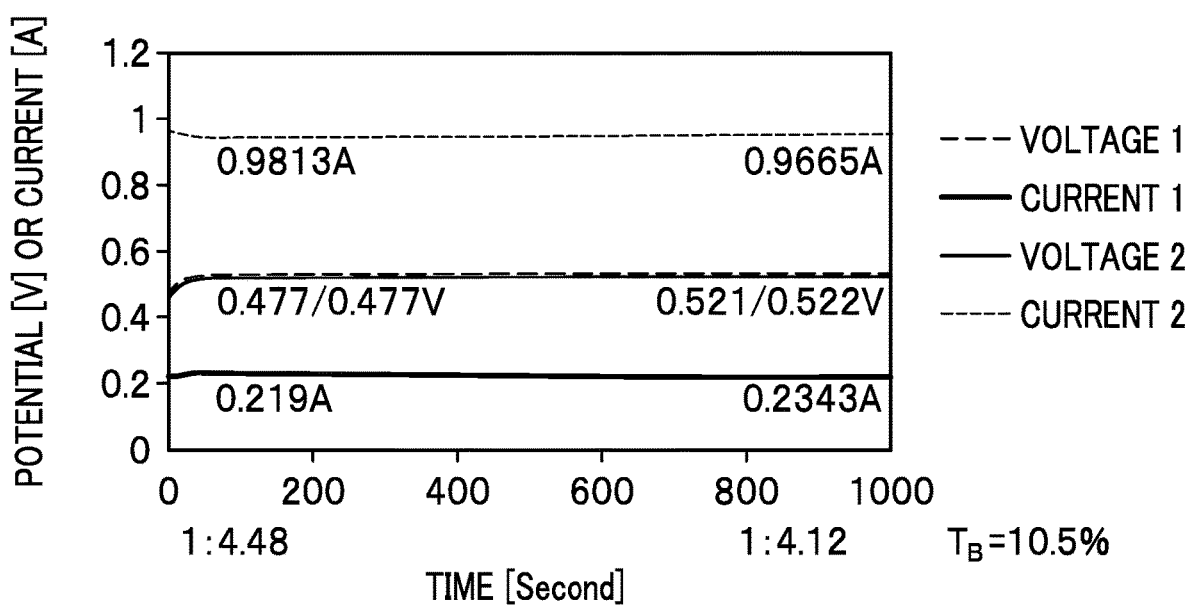
FIG. 9B is a graph showing a change over time in electric current value and voltage value of the cathodes when a correction to a potential using a feedback circuit was carried out in the second plating apparatus.

On the contrary, as shown in FIG. 9B, in a case where a correction to an electrode potential was carried out, electrode potentials of the pair of second cathodes 13BX, 13BY exactly coincide with each other within a range of a measurement error. The current distribution ratio was 1:4.12 because an adverse effect caused by the wiring resistance and the like was eliminated. For this reason, the uniform electroplating index $T_B$ using an estimated amount of a plated material dramatically reduced to 10.5(%). Namely, it was found that at the plating bath 2 used in the example 3 the uniform electroplating index $T_B$ using the estimated amount of the plated material was 10.5(%) in actuality.

Example 4

A copper sulfate plating was performed without additives by using the second plating apparatus 1B (see FIG. 4). The total electric current of the electric circuit was set to be 1.2 (A), and the anode-cathode distance ratio was set to be 1:5. A correction to an electrode potential was carried out by the second feedback circuit 21B, and plating was performed in a general bath and in a High throwing bath. A change over time in current distribution ratio in this case is shown in FIG. 10A, and a change over time in electrolytic voltage is shown in FIG. 10B.

Figure 10A:
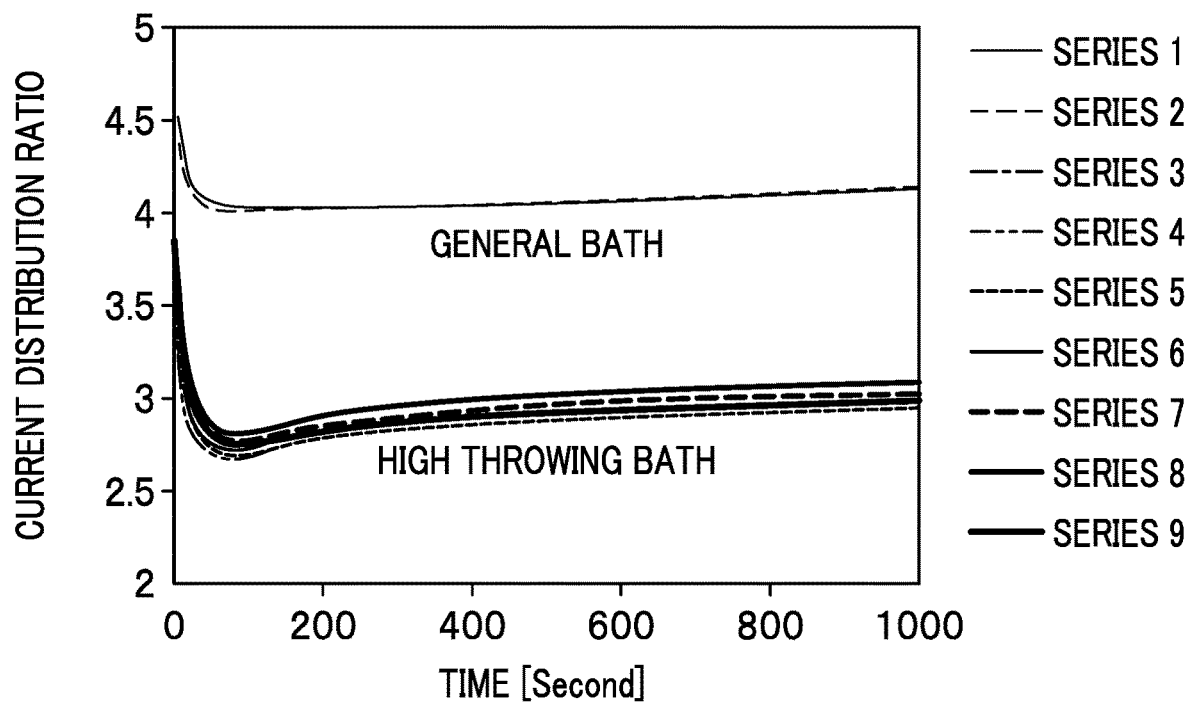
FIG. 10A is a graph showing a change over time in current distribution ratio when a correction to a potential using a feedback circuit was carried out in the second plating apparatus.

As shown in FIG. 10A, a clear difference was found in current distribution ratio in accordance with the types of the plating bath 2. The uniform electroplating index $T_B$ using the estimated amount of the plated material in the general bath was 11(%), and the uniform electroplating index $T_B$ using the estimated amount of the plated material in the High throwing bath was 33(%).

Figure 10B:
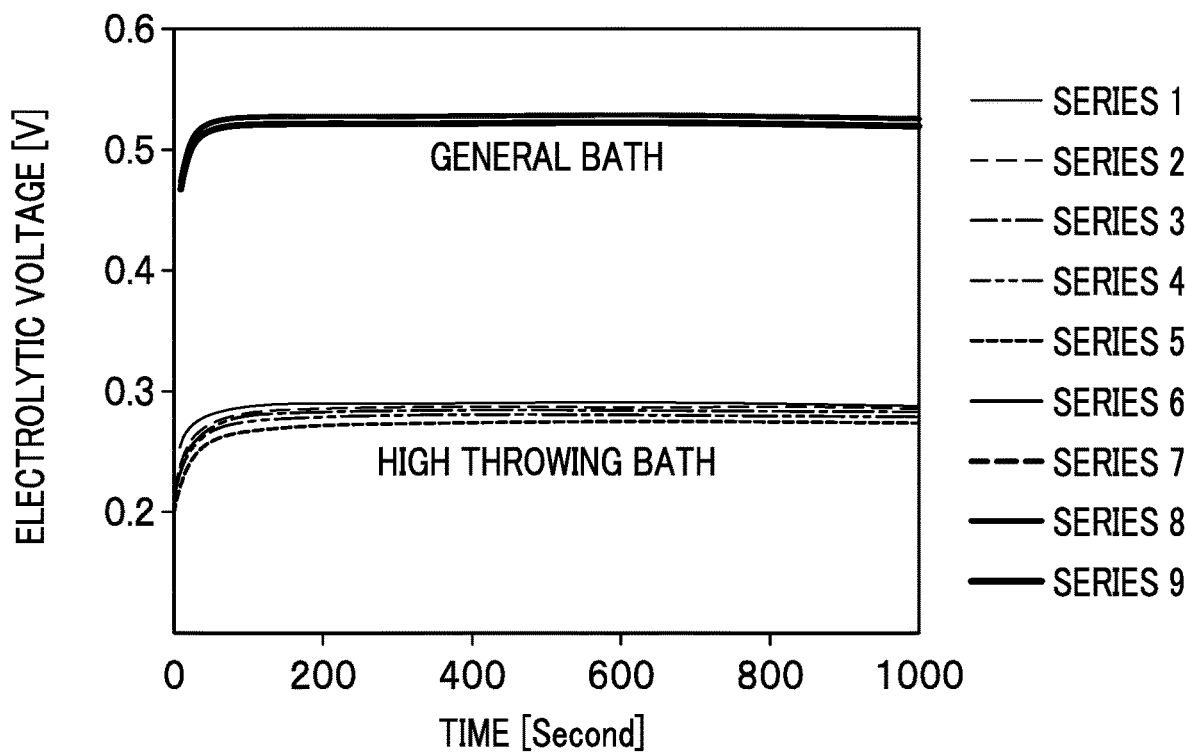
FIG. 10B is a graph showing a change over time in electrolytic voltage when a correction to a potential using a feedback circuit was carried out in the second plating apparatus.

Further, as shown in FIG. 10B, the behavior of an electrolytic potential at the start of electrolysis was different when comparing the states (series 2 to series 5) in which a coating film (black film) had been formed on the second anode 12B in the High throwing bath and the state (series 1) in which a coating film had not been formed on the second anode 12 in the High throwing bath. An increase in electrolytic voltage seen at the start of plating indicates an increase in concentration overvoltage caused by a decrease in the number of copper ions in the vicinity of the second cathodes 13BX, 13BY. Accordingly, if electrode potentials of the second cathodes 13BX, 13BY are made equal to each other by the feedback control under a constant electric current according to which a summation of electric currents flowing through the second cathodes 13BX, 13BY is constant, it is possible to measure a small change on plating.

DESCRIPTION OF REFERENCE NUMERALS 1A first plating apparatus (plating apparatus)
1B second plating apparatus
2 plating bath
4 substrate (insulating substrate)
5 hole
11A first plating bathtub (plating bathtub)
11B second plating bathtub
12A first anode (anode)
12B second anode
13A, 13AX, 13AY first cathode (cathode)
13B, 13BX, 13BY second cathode
14A first plating power source (plating power source)
14B second plating power source
21A first feedback circuit (feedback circuit)
21B second feedback circuit
22A first current measuring circuit (current measuring portion)
22B second current measuring circuit (second current measuring portion)

The invention claimed is:

1. A plating apparatus comprising:
an anode disposed in a plating bathtub;
an insulating substrate having a hole, the insulating substrate being disposed in the plating bathtub;
a pair of cathodes, each cathode being provided in the insulating substrate at a bottom portion of the hole and at a surface on an opening side of the hole;
a plating power source configured to supply an electric current between the anode and the pair of cathodes; and
at least one of an electric current measuring portion configured to measure respective values of electric currents flowing through the pair of cathodes and a voltage measuring portion configured to measure voltage values of the pair of cathodes.

2. A plating apparatus comprising:
an anode disposed in a plating bathtub;
an insulating substrate having a hole, the insulating substrate being disposed in the plating bathtub;
a pair of cathodes, each cathode being provided in the insulating substrate at a bottom portion of the hole and at a surface on an opening side of the hole;
a plating power source configured to supply an electric current between the anode and the pair of cathodes;
a feedback circuit configured to have an electrode potential of one of the pair of cathodes equal to an electrode potential of another one of the pair of cathodes under a condition that a summation of values of electric currents flowing through the pair of cathodes is kept constant; and
an electric current measuring portion configured to measure respective values of electric currents flowing through the pair of cathodes.

3. A plating system comprising:
the plating apparatus according to claim 1; and
a second plating apparatus,
wherein the second plating apparatus comprises:
a second anode and a pair of second cathodes disposed in a second plating bathtub;
a second plating power source configured to supply an electric current between the second anode and the pair of second cathodes; and
a second feedback circuit configured to have an electrode potential of one of the pair of second cathodes equal to an electrode potential of another one of the pair of second cathodes under a condition that a summation of values of electric currents flowing through the pair of second cathodes is kept constant.

4. The plating system according to claim 3, further comprising a second electric current measuring portion configured to measure respective values of electric currents flowing through the pair of second cathodes.

5. A plating system comprising:
the plating apparatus according to claim 2; and
a second plating apparatus,
wherein the second plating apparatus comprises:
- a second anode and a pair of second cathodes disposed in a second plating bathtub;
- a second plating power source configured to supply an electric current between the second anode and the pair of second cathodes; and
- a second feedback circuit configured to have an electrode potential of one of the pair of second cathodes equal to an electrode potential of another one of the pair of second cathodes under a condition that a summation of values of electric currents flowing through the pair of second cathodes is kept constant.

6. The plating system according to claim 5, further comprising a second electric current measuring portion configured to measure respective values of electric currents flowing through the pair of second cathodes.

\* \* \* \* \*